United States Patent [19]

Ernst

[11] Patent Number: 4,483,554
[45] Date of Patent: Nov. 20, 1984

[54] SPLASH GUARD RING FOR PIPE FLANGES

[76] Inventor: Manfred Ernst, Georg August Zinn-Str. 29, 6054 Rodgau, Fed. Rep. of Germany

[21] Appl. No.: 355,225
[22] Filed: Mar. 5, 1982
[30] Foreign Application Priority Data

Nov. 26, 1981 [DE] Fed. Rep. of Germany ....... 3146803

[51] Int. Cl.³ .......................... F16L 55/00; F16L 23/00
[52] U.S. Cl. ......................................... 285/45; 285/14; 285/365
[58] Field of Search ....................... 285/13, 14, 15, 45, 285/365, 150

[56] References Cited

U.S. PATENT DOCUMENTS

| | | | |
|---|---|---|---|
| 1,459,666 | 6/1923 | Adams | 285/150 |
| 3,113,790 | 12/1963 | Matthiessen | 285/45 |
| 3,527,479 | 9/1970 | Matthiessen | 285/45 |
| 3,561,793 | 2/1971 | Rode | 285/13 |
| 3,736,955 | 6/1973 | Schlesser | 285/150 |
| 4,127,287 | 11/1978 | Davies | 285/14 X |
| 4,216,980 | 8/1980 | Shreve | 285/45 X |

FOREIGN PATENT DOCUMENTS 901048 7/1962 United Kingdom ............... 285/365

Primary Examiner—Richard J. Scanlan, Jr.
Attorney, Agent, or Firm—Schwartz, Jeffery, Schwaab, Mack, Blumenthal & Koch

[57] ABSTRACT

A splash guard ring insures the safe exist of liquid underline pressure from pipeline without splashing and without the dangerous projection of the stream of liquid. The features of the splash guard ring provide for the division of the area enclosed by the ring itself and the flanges of adjoining pipe members in the pipeline. The divided areas are interconnected such that liquid flowing from the pipeline is diverted into smaller streams partially opposing and/or crossing each other.

11 Claims, 8 Drawing Figures

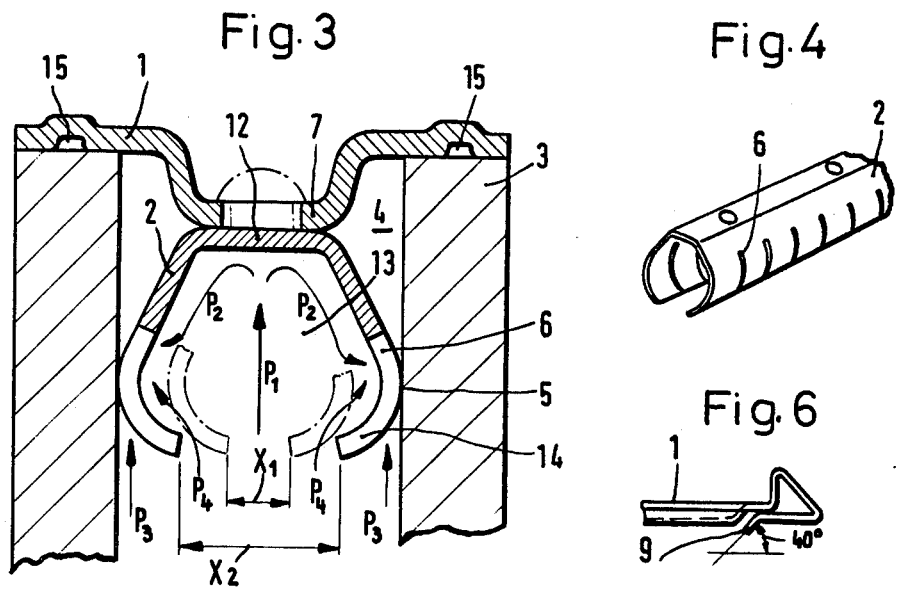
Fig. 3
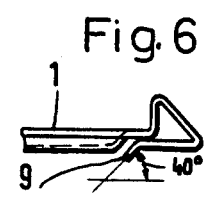
Fig. 4
Fig. 6
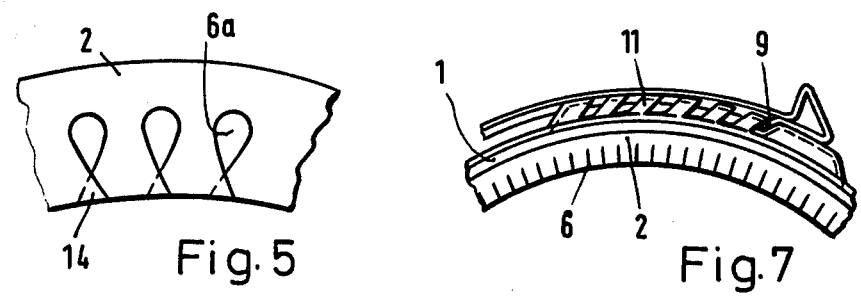
Fig. 5  Fig. 7
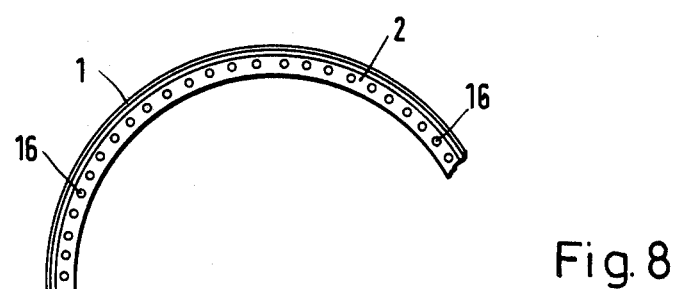
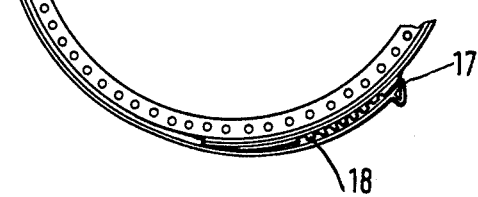
Fig. 8

SPLASH GUARD RING FOR PIPE FLANGES

BACKGROUND OF THE INVENTION

1. Field of the Invention

The invention concerns a splash guard ring for the flanges of connecting pipe members in a pipeline comprising a tightening strap covering the flange ends and the gap between the flanges.

2. Background of the Prior Art

Splash guard rings serve to secure the environment of pipelines carrying toxic or combustible or otherwise dangerous liquids and to protect persons present in their vicinity against injury by the liquid escaping under pressure in the case of a failure of a seal. The function of splash guard rings is to restrain the liquid which, in the case of a gasket failure of this type, will escape in a far reaching stream. The liquid is restrained and will run off within a small area around the location of the fracture. The use of such splash guard rings on lines carrying dangerous liquids is prescribed by law, but the known splash guard rings are incapable of performing their intended role.

One known splash guard ring of the aforementioned type consists of a smooth strip with a thickness of 0.5 to 1.5 mm made of zinc coated steel strip or a strong synthetic plastic material, for example, polypropylene or polyethylene. The strip is fastened by means of a separate fastener element, such as for example, sheet screws, machine screws, pins, rivets, clamping clips or the like directly to the flange joint. In another known form of a splash guard ring, a corrugated strip is provided in place of the smooth band. The same configuration and mode of fastening is employed in this form.

In the case of the smooth strip form of the splash guard ring, the space enclosed between the gasket, the splash guard ring and the flanges is filled immediately with liquid following a failure of the seal, whereupon a flow of liquid is formed in the space due to the outlet pressure and its high kinetic energy. The liquid will exit through an opening between the flange and the splash guard with a corresponding high kinetic energy. The same result of a widespread propagation of the liquid in the case of a failure of the gasket is to be expected when using the splash guard ring consisting of a corrugated strip. In this case, the liquid exiting through the opening encounters a bottom or several bottoms of the corrugation, depending on the location of the break. The liquid is then diverted by 90° and again exits as it builds up in a sharp jet through the free space between the flanges and the corrugated splash guard ring. The object of the prevention of a sharp jet is not attained in any of these cases.

The known splash guard rings are afflicted by a further common disadvantage. Mounting by means of separate fastening elements is cumbersome and time consuming. There is also the well-founded risk that the application of fastening elements, for example screws, is at least in part omitted, if for example, a screw is lost or has become useless because of corrosion and the installer does not have a suitable replacement immediately available.

SUMMARY OF THE INVENTION

It is the object of the present invention to provide a splash guard ring insuring the exit of liquid under line pressure from pipelines without splashing in case of a failure of a seal entirely. The invention provides for the division of the area enclosed by the splash guard ring, the flanges and the flange gasket into partial spaces interconnected so that the liquid flowing from the pipeline is divided through diversion into partial flows opposing and/or crossing each other.

The invention also provides a splash guard ring whereby the kinetic flow energy inherent in the liquid during its exit from the pipeline is extensively and gradually reduced in the space bordered by the splash guard ring. The liquid is multiply diverted on outflow edges and baffle surfaces into a plurality of smaller streams and guided into corresponding opposing or at least crossing each other by means of the formation of suitable channels. The liquid then flows out practically without pressure between the splash guard ring and the flanges. The formation of a high energy jets or the spraying of the liquid as the result of the impact of a high energy jet on a free baffle surface are reliably prevented.

In an embodiment of the invention, particularly suitable for metal construction, the splash guard ring is made of a stretched strip of spring steel in the form of a clamp equipped with an essentially C-shaped spring member, fastened approximately at its center line to the clamp so that during installation its curvatures abut with a spring action on both sides against the inner surfaces of the flanges. The spring member is provided with a plurality of slots beginning at its free edges and extending beyond the support line. In this embodiment, the slots are partially closed by the tightening of the clamp around the flange, whereby the slots are placed against each other or, in the case of small diameter flanges, overlap, thus partially closing the slots and forming a passage orifice extending on both sides of the support lines. Thus, a space is defined between the clamp, the C-shaped member and the flanges. The liquid flows into this space in crossing or opposing flows through the common passage opening.

The same result is obtained with an embodiment especially suitable for devices made of a synthetic plastic material wherein the splash guard ring or clamp is prebent into an open ring and provided with C-shaped spring members which are further equipped with lateral openings in place of slots.

In a further advantageous embodiment, the clamp is provided on both sides parallel to the C-shaped spring member with circumferential grooves. Such grooves cause the liquid passing from the inner "expansion chamber" to the outside to further multiply, divert, or otherwise change direction whereby an additional reduction of the pressure and the kinetic energy is achieved. The grooves may be applied in the form of rolled beading, for example, when the clamp is made of steel strip or as molded flutes when the clamp is made of a synthetic plastic.

In order to simplify the installation, it is advantageous to equip the clamp on one end with a resilient locking projection extending over the entire width of the clamp and on the other end with a slotted locking strip, arranged advantageously at a distance from the end of the clamp, so that the free end of the clamp is corresponding at least to the length of the locking strip. It is possible in this manner to install the device without tools and without the need for additional fastening elements, such as screws, wherein the C-shaped spring member prevents any lateral escape and further the elasticity provided by the spring projection of the mounting of the clamp insures the flexible absorption of suddenly appearing impact loads, while finally the broad overlapping of the clamp ends assures the secure holding of the clamp on the flange, regardless of the application of such impact loads.

Both the reduction of kinetic energy and the secure mounting of the splash guard ring on the flanges may be further improved substantially by equipping the clamp in its center zone with a bead having a width less than the width of the flange gap. The spring member is then fastened to the bead. This improves on the one hand the mounting of the ring between the flanges and on the other, it enlarges the inner diversion chamber essentially responsible for the destruction of the kinetic flow energy.

BRIEF DESCRIPTION OF THE DRAWING

The invention is illustrated in the drawing as follows:

FIG. 3 illustrates a cross section through a splash guard ring after installation;

FIG. 4 shows a perspective view of the C-shaped spring member;

FIG. 5 is a partial lateral elevation of the C-shaped spring member after installation;

FIG. 6 illustrates an enlarged view of the end of the clamp with a resilient lock-in projection;

FIG. 7 shows an enlarged partial view of the splash guard ring after installation in the area of the clamp end; and FIG. 8 represents an embodiment of a splash guard ring made of a synthetic plastic material.

DETAILED DESCRIPTION OF THE PREFERRED EMBODIMENT

Figure 1:
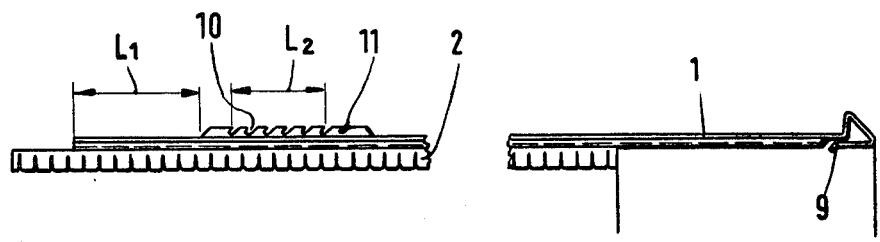
FIG. 1 shows a lateral elevation of a splash guard ring with a strip steel clamp according to the invention.
Figure 2:
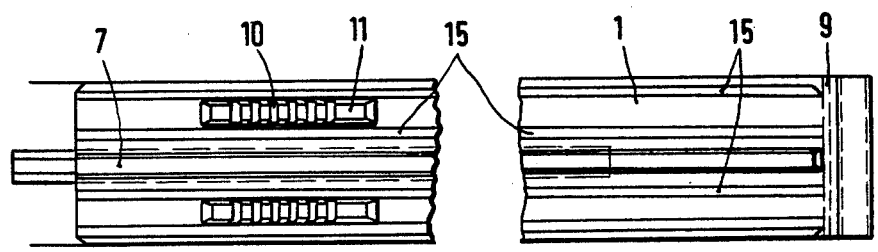
FIG. 2 is a top view of FIG. 1.

As shown in FIG. 1, 1 designates a stretched clamp made of steel strip, which according to the invention, is equipped with an essentially C-shaped spring member. The strip 2 is resilient and is fastened at its approximate center line or center area to the clamp 1 in a manner so that it rests during installation (see FIG. 3) resiliently against the inner surfaces of the flanges 3. Between the flanges 3, the C-shaped spring member 2, clamp 1, two annular spaces 4 and a diverting space 13, are defined, while the spring member 2 is equipped on both sides beginning at the free edges with slots 6 extending past the area of the support lines 5. In the embodiment shown, the slots exist essentially at right angles to the border edge of the spring member, but they may also be provided at an angle to the edge. The angled arrangement provides certain advantages during installation and also with respect to the technical conditions of flow within the pipeline. In the embodiment wherein the splash guard ring is made of a synthetic plastic, the clamp advantageously has the configuration of a premolded, open ring and, simple passage boreholes are provided in place of the slots which are partially closed upon bending.

The clamp is equipped as shown in FIG. 3 with a bead 7 which has a width that is less than the width of the flange gap. The guidance and mounting of the splash guard ring between the flanges is improved by this design. In addition, the position of the C-shaped spring member is displaced toward the center of the pipe flange in the direction of the gasket, while correspondingly, the chamber 4 responsible for the reduction of the kinetic energy in the event of seal failure is increased.

The clamp 1 is further provided with grooves 15 on either side of the C-shaped spring member 2. These grooves are present in the example shown of a steel strip clamp in the form of rolled beads. If the clamp is made of a synthetic plastic, the grooves may be injection molded in the manufacturing process onto the inside, i.e. the side facing the flanges 3. In this manner, a further reduction in pressure and velocity is obtained over the flow path of the liquid between the chambers 4 and the outer environment by means of diversion and whirling.

The clamp 1 is equipped as shown in FIG. 6 at its end with a locking projection 9, which is bent in a single piece from the clamp and is, therefore, resilient. The locking projection extends over the entire width of the strip in the embodiment illustrated and cooperates with two slotted locking strips 11, arranged on either side of the bead 7 and provided with six slots 10. The slots are inclined of approximately 35° to 40° with respect to the horiziontal plane of the annular circumference and form notches for the locking projections 9. The slotted locking strip is mounted a distance from the end of the clamp so that the length $L_1$ of the free end of the strip corresponds at least to the length $L_2$ of the slotted locking strip 11 (see FIG. 1.)

To install the splash guard ring, initially the C-shaped spring member is inserted in the flange gap and the clamp placed around the circumference of the flange. On the one hand, by virtue of the resilient properties of the C-shaped spring member and the more or less extensive spring deflection of the two lateral C-shaped legs, the different tolerances in the width of the flange gaps are equalized approximately over a circumference of $X_1/X_2$ (see FIG. 3). On the other hand, by the guidance of the slots 6 into the vicinity of the center area 12 of the C-shaped spring member, the bending of the clamp around the circumference of the flange is made possible. During the insertion between the flanges, a chamber 13 is partitioned off. This is accomplished by means of the bending of the C-shaped spring ends 14, more or less extensive depending on the width of the flange gap. The chamber 13 is open in the manner of a slit toward the gasket (not shown). As the result of the tightening of the clamp around the flange 3, the slots 6 are partially closed by the approach or, in the case of flanges with suitably small diameters, the overlapping of the bordering edges of the slots in the manner schematically shown in FIG. 5. This results in a passage orifice 6a, extending essentially only on either side of the support lines 5.

The splash guard ring is then tightly locked under tension around the flange by means of the resilient bending of the locking projection 9 and its insertion into a suitable slot 10 of the slotted locking strip 11.

In the event of a failure of the seal or gasket of the pipeline, the medium flowing out from the pipeline is flowing in part as illustrated by the arrow $P_1$ into the chamber 13 and impacts in part according to the arrow $P_3$. The closed ends 14 of the C-shaped spring member represent a baffle edge. The medium flows in part into the chamber enclosed between the end 14 and the flange. Consequently, both streams are already exposed to a significant braking effect due to the impact and the diversion. Thus, the kinetic energy of the streams are reduced. The liquid flowing in the direction of the arrow $P_1$ against the baffle surface 12, is diverted in accordance with the arrow $P_2$ toward the slots 6 and following this path, in keeping with the arrow $P_4$, flows directly against the liquid flowing in the direction of the slots 6. The counter current flow serves to destroy another quantum of the kinetic flow energy. The liquid decelerated in this manner now passes into the chamber 4 and encounters the liquid flowing along the wall of the flange through the open part of the slots 6 directly into the chamber 4 in accordance with the arrow $P_3$. As the two flows have flow directions crossing to oppose each other, their remaining kinetic energy is essentially destroyed with the effect being reinforced by the fact that in their passage the flows are entering an unfilled chamber 4 from which they can flow off without pressure. The chamber 4 is not filled and the pressure to form a pressured, far reaching jet is not building up. Instead the liquid is emerging without pressure and velocity, while any residual flow energy is destroyed in the grooves 15.

In the embodiment shown in FIG. 8, the entire splash guard ring is made of a synthetic plastic material and thus displays an already bent configuration that is essentially circular, in the unmounted state instead of a straight shape. The clamp 1 and the C-shaped spring member 2 are injection molded into a single piece, wherein in place of the orifices formed by the compression of the slots, a corresponding number of passage holes 16 are provided. Both the locking projections 17 and the slotted locking strip 18 are in this case injection molded directly in a single piece onto the clamp 1, with the elasticity required for the installation and tension being inherent in the material itself.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

What is claimed is:

1. A splash guard ring for the flanges of connecting pipe members in a pipeline comprising:
   a resilient clamp in the form of a premolded open ring;
   a C-shaped spring member attached to said resilient clamp;
   said C-shaped spring member having a plurality of bores for the passage of fluids therethrough.

2. The splash guard ring according to claim 1, wherein said resilient clamp is equipped with a bead fastened to said spring member.

3. The splash guard ring according to claim 1, wherein said resilient clamp is provided on one of its ends with a resilient locking projection and on its other end with a slotted locking strip comprising a plurality of slots.

4. The splash guard ring according to claim 3, wherein said slotted locking strip is arranged at a distance from the end of said resilient clamp so that the free end $L_1$ of said clamp corresponds at least to the length $L_2$ of said slotted locking strip.

5. A splash guard ring connection comprising:
   a pair of flanged pipe members adjacent one another in the form of a pipeline;
   a resilient clamp surrounding the ends of said adjacent pipe members;
   a C-shaped spring member attached to said resilient clamp between said adjacent pipe members and having two spring arms wherein each spring arm abuts one of the end surfaces of one of the flanged pipe members.

6. The splash guard ring according to claim 5, wherein the resilient clamp is a steel strip and the C-shaped spring member displays a plurality of slots on either side beginning at the free edges and extending past the support line to form the passage orifices.

7. The splash guard ring according to claim 6, wherein said slots issuing from the edge of said spring member are extending at an acute angle to said edge of said spring member.

8. The splash guard ring according to claim 5, wherein the resilient clamp is a premolded open ring and the C-shaped spring member is provided with a plurality of bores in the area of the support line in the annular space formed by the clamp, the steel strip and the flanged pair.

9. The splash guard ring according to claim 5, wherein said resilient clamp is equipped with a bead fastened to said spring member.

10. The splash guard ring according to claim 5, wherein said resilient clamp is provided on one of its ends with a resilient locking projection and on its other end with a slotted locking strip comprising a plurality of slots.

11. The splash guard ring according to claim 10, wherein said slotted locking strip is arrangd at a distance from the end of said resilient clamp, so that the free end $L_1$ of said clamp corresponds at least to the length $L_2$ of said slotted locking strip.

* * * * *